(12) United States Patent
Suh et al.

(10) Patent No.: US 11,237,405 B2
(45) Date of Patent: Feb. 1, 2022

(54) CAMERA MODULE HAVING STABILIZER PROVIDING STABILIZATION FUNCTION AND ELECTRONIC DEVICE INCLUDING THE CAMERA MODULE

(71) Applicant: Samsung Electronics Co., Ltd., Suwon-si (KR)

(72) Inventors: Sang-min Suh, Seoul (KR); Seong-woo Ahn, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 226 days.

(21) Appl. No.: 16/376,401

(22) Filed: Apr. 5, 2019

(65) Prior Publication Data
US 2019/0346740 A1    Nov. 14, 2019

(30) Foreign Application Priority Data
May 9, 2018    (KR) .......................... 10-2018-0053208

(51) Int. Cl.
*G02B 27/64* (2006.01)
*G03B 5/00* (2021.01)
(Continued)

(52) U.S. Cl.
CPC ............. *G02B 27/646* (2013.01); *G03B 5/00* (2013.01); *G02B 7/021* (2013.01);
(Continued)

(58) Field of Classification Search
CPC ............................................ G03B 2205/0061
See application file for complete search history.

(56) References Cited

U.S. PATENT DOCUMENTS 6,005,723 A * 12/1999 Kosaka ................ G02B 27/646
    348/E5.046
7,295,770 B2 * 11/2007 Uenaka ................ G02B 27/646
    348/208.7
(Continued)

FOREIGN PATENT DOCUMENTS

CN    101324708 A    12/2008
CN    105071690 A    11/2015
(Continued)

OTHER PUBLICATIONS

ROHM Semiconductor, Optical Image Stabilization (OIS), CUS13004-Ver.1, Internet, www.rohm.com, 12 pages.
(Continued)

*Primary Examiner* — Clayton E. LaBalle
*Assistant Examiner* — Leon W Rhodes, Jr.
(74) *Attorney, Agent, or Firm* — Harness, Dickey & Pierce, P.L.C.

(57) ABSTRACT

The camera module includes: a first frame that is formed to surround a lens and fixes the lens; a second frame that is formed to surround the first frame and is apart from the first frame; a third frame that is formed to surround the second frame and is apart from the second frame; a plurality of first piezoelectric actuators that connect the first frame to the second frame; and a plurality of second piezoelectric actuators that connect the second frame to the third frame, wherein the plurality of first piezoelectric actuators are arranged in parallel in a first direction around the lens, and the plurality of second piezoelectric actuators are arranged in parallel in a second direction around the lens.

20 Claims, 11 Drawing Sheets

(51) Int. Cl.
*H02N 2/02* (2006.01)
*G02B 7/02* (2021.01)

(52) U.S. Cl.
CPC ............. *G03B 2205/0007* (2013.01); *G03B 2205/0015* (2013.01); *G03B 2205/0061* (2013.01); *H02N 2/028* (2013.01)

(56) References Cited

U.S. PATENT DOCUMENTS

| | | | |
|---|---|---|---|
| 7,554,075 B2 * | 6/2009 | Tanaka | G02B 27/646 |
| | | | 250/216 |
| 7,742,691 B2 | 6/2010 | Takahashi et al. | |
| 7,840,127 B2 * | 11/2010 | Suzuki | G02B 27/646 |
| | | | 396/55 |
| 8,041,201 B2 | 10/2011 | Eromaki et al. | |
| 8,542,988 B2 * | 9/2013 | Lee | G03B 5/00 |
| | | | 396/55 |
| 8,665,339 B2 | 3/2014 | Shin et al. | |
| 8,937,665 B2 | 1/2015 | Kim | |
| 9,081,203 B2 | 7/2015 | Shin | |
| 9,213,223 B2 * | 12/2015 | Mashitani | H04N 9/312 |
| 9,489,564 B2 * | 11/2016 | Gattuso | H04N 5/23219 |
| 9,810,920 B2 | 11/2017 | Siegrist et al. | |
| 10,180,584 B2 * | 1/2019 | Gong | H04N 5/232127 |
| 2012/0328275 A1 | 12/2012 | Lee | |
| 2013/0208369 A1 | 8/2013 | Lam | |
| 2014/0125825 A1 | 5/2014 | Baer et al. | |
| 2015/0002938 A1 | 1/2015 | Bach | |
| 2017/0054883 A1 | 2/2017 | Sharma et al. | |

FOREIGN PATENT DOCUMENTS

| | | | | |
|---|---|---|---|---|
| CN | 106125453 A | | 11/2016 | |
| JP | 2001350196 A | * | 12/2001 | |
| JP | 2009093001 A | * | 4/2009 | G03B 5/02 |
| KR | 10-1573073 B1 | | 12/2015 | |
| KR | 10-2016-0138958 | | 12/2016 | |
| KR | 10-2017-0016639 | | 2/2017 | |
| KR | 10-1730010 B1 | | 4/2017 | |

OTHER PUBLICATIONS

Fabrizio La Rosa et al., Optical Image Stabilization (OIS) STMicroelectronics, 26 Pages.
Chinese Office Action dated Oct. 18, 2021 issued in corresponding Chinese Appln. No. 201910235335.4.

* cited by examiner

< CONVENTIONAL LENS ASSEMBLY >

< CONVENTIONAL CAMERA MODULE >

CAMERA MODULE HAVING STABILIZER PROVIDING STABILIZATION FUNCTION AND ELECTRONIC DEVICE INCLUDING THE CAMERA MODULE

CROSS-REFERENCE TO RELATED APPLICATION

This application claims the benefit of Korean Patent Application No. 10-2018-0053208, filed on May 9, 2018, in the Korean Intellectual Property Office, the disclosure of which is incorporated herein in its entirety by reference.

BACKGROUND

Example embodiments of the inventive concepts relate to a camera module and an electronic device including the same, and more particularly, to a camera module configured to stabilize images blurred by hand tremble and an electronic device including the same.

With the recent development of technology of compact and lightweight digital cameras, a camera device may be mounted on a mobile communication terminal, and thus, a mobile communication terminal equipped with an optical lens and a camera device has become a common trend.

Due to the increasing mobility of a camera module mounted on the mobile communication terminal, the possibility of image blur caused by tiny vibration or hand tremble by a user has increased. In addition, the increase in shots during moving raises the necessity for image stabilization, etc. to take a clear image.

At present, the techniques for image stabilization are roughly classified into two types. One of the techniques for image stabilization includes an electronic stabilizing technique such as a digital image stabilization (DIS) method, or an electronic image stabilization (EIS) method, which is a method of detecting hand tremble from the captured result image, and correcting data stored in a camera module or memory, to thereby produce an image without blur by adjusting the position and the color with an electronic method or a program, after a processor receives the blurred image as it is. Although such electronic technique for image stabilization has the advantages of low cost and small structural constraint for easy adoption, since a separate mechanical and physical configuration is unnecessary, there is a disadvantage of requiring a separate memory or a high-performance camera device, because the image is stabilized by the program. Furthermore, there are also disadvantages of slow photographing speed due to longer time required to stabilize an already-blurred image, and declining image stabilization rate due to the limitation in removing the afterimage through the program.

Another type of technique for image stabilization is an optical image stabilization (OIS) device. OIS is a method of producing a blur-free image of a subject formed on a camera device, even when photographic equipment is shaken, by detecting the hand tremble of the user, and changing the position of the optical lens or the camera device. Such OIS can remove the afterimage by focusing the image without blurring above the camera device to increase the stabilization rate. Therefore, under a condition of using camera devices with the same performance, OIS can capture relatively clearer images than a device using DIS or EIS.

SUMMARY

Example embodiments of the inventive concepts provide a camera module configured to correct image distortion due to hand tremble of a user and an electronic device including the camera module.

According to some example embodiments, there is provided a camera module including: a first frame that is formed to surround a lens and fixes the lens; a second frame that is formed to surround the first frame, and is apart from the first frame; a third frame that is formed to surround the second frame, and is apart from the second frame; a plurality of first piezoelectric actuators that connect the first frame to the second frame; and a plurality of second piezoelectric actuators that connect the second frame to the third frame, wherein the first piezoelectric actuators may be arranged in parallel in a first direction around the lens, and the second piezoelectric actuators may be arranged in parallel in a second direction around the lens.

According to some example embodiments, there is provided a camera module including a lens assembly, the lens assembly including: a first frame that is formed to surround a lens and fixes the lens; a second frame that is formed to surround the first frame and is apart from the first frame; a third frame that is formed to surround the second frame and is apart from the second frame; a plurality of first piezoelectric actuators that connect the first frame and the second frame and adjust a distance between the first frame and the second frame in a first direction; and a plurality of second piezoelectric actuators that connect the second frame and the third frame and adjust a distance between the second frame and the third frame in a second direction perpendicular to a first direction.

According to some example embodiments, there is provided an electronic device including a camera module configured to provide an image stabilization function, the camera module including: a controller which performs the image stabilization function; and a lens assembly to which light is incident, wherein the lens assembly includes a first frame that is formed to surround a lens and fixes the lens; a second frame that is formed to surround the first frame and is apart from the first frame; a third frame that is formed to surround the second frame and is apart from the second frame; a plurality of first piezoelectric actuators that connect the first frame to the second frame and adjust a distance between the first frame and the second frame in a first direction; and a plurality of second piezoelectric actuators that connect the second frame to the third frame and adjust a distance between the second frame and the third frame in a second direction perpendicular to the first direction.

BRIEF DESCRIPTION OF THE DRAWINGS

Example embodiments of the inventive concepts will be more clearly understood from the following detailed description taken in conjunctions with the accompanying drawings in which.

DETAILED DESCRIPTION

Hereafter, some example embodiments will be described in detail with reference to the attached drawings.

Figure 1:
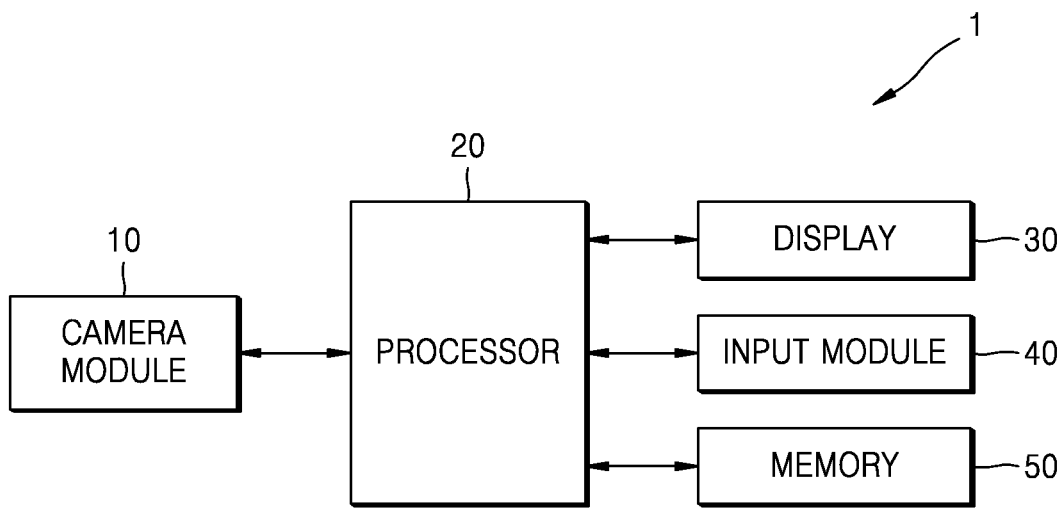
FIG. 1 is a block diagram of a configuration of an electronic device according to some example embodiments of the inventive concepts.

FIG. 1 is a block diagram of a configuration of an electronic device 1 according to some example embodiments of the inventive concepts.

Referring to FIG. 1, the electronic device 1 may include a camera module 10, a processor 20, a display 30, an input module 40, and a memory 50. According to some example embodiments, the electronic device 1 may include an electronic device with a photographing function, such as a smart phone or a digital camera.

The camera module 10 may capture a visible image (e.g. a picture or a video) through a lens. According to some example embodiments, the camera module 10 may perform image stabilization to prevent image blur caused by hand tremble of a user during image capture.

The processor 20 may control the overall operation of the electronic device 1. According to some example embodiments, the processor 20 may control the camera module 10, the display 30, the input module 40, and the memory 50 to perform image stabilization.

The display 30 may display an image captured by the camera module 10 or an image stored in the memory 50.

The input module 40 may receive a user input. According to some example embodiments, the input module 40 may receive a user input for image capture or image storing. According to some example embodiments, the input module 40 may receive a user input for setting whether to use the image stabilization function.

The input module 40 may include a touch sensor panel for sensing the touch operation of the user, or a pen sensor panel for sensing the pen operation of the user. According to some example embodiments, the input module 40 may include a motion recognition sensor for recognizing user motion, or a voice recognition sensor for recognizing the user's voice. According to some example embodiments, the input module 40 may include various types of input buttons, such as a push button or a jog button. According to some example embodiments, the display 30 and the input module 40 may be implemented as a touch screen in which an input panel is arranged above the display panel to simultaneously perform display and touch operation sensing, for example.

The memory 50 may store images captured by the camera module 10. For example, the memory 50 may store images such as photos or videos.

Although one camera module 10 is included in the electronic device 1 in FIG. 1, example embodiments of the inventive concepts are not limited thereto. According to some other example embodiments, the electronic device 1 may include a plurality of camera modules, wherein at least some of the plurality of camera modules included in the electronic device 1 may provide the image stabilization function.

Figure 2:
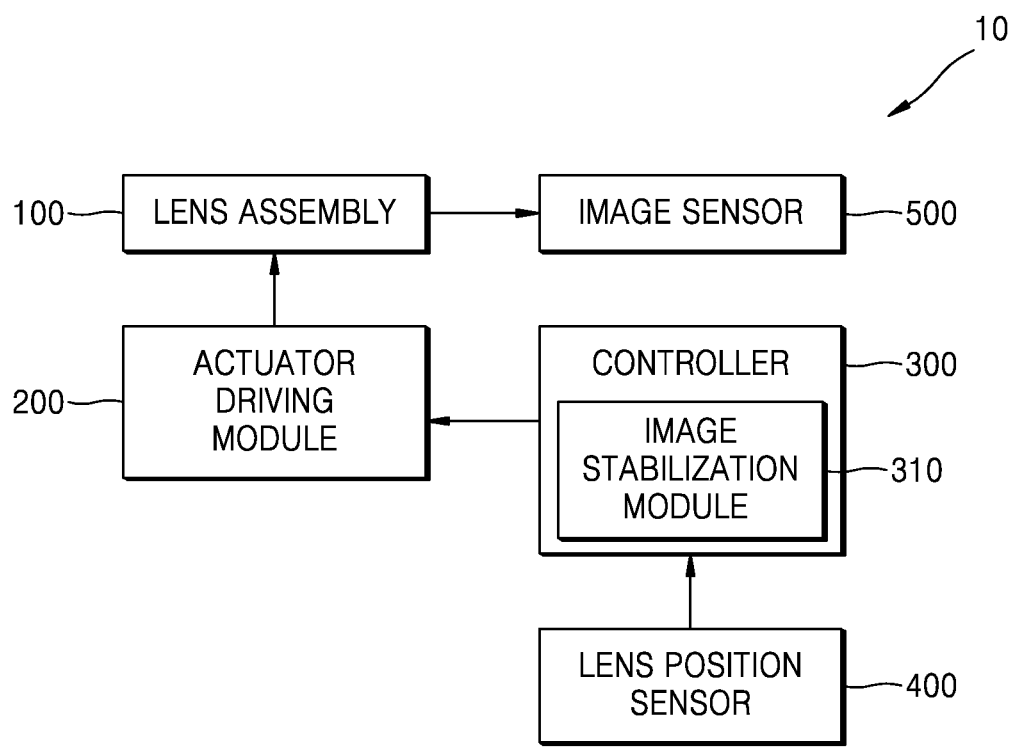
FIG. 2 is a block diagram of a camera module according to some example embodiments of the inventive concepts.

FIG. 2 is a block diagram of the camera module 10 according to some example embodiments of inventive concepts.

Referring to FIG. 1 and FIG. 2, the camera module 10 may include a lens assembly 100, an actuator driving module 200, a controller 300 for executing an image stabilization module 310, a lens position sensor 400, and an image sensor 500.

The lens assembly 100 may include a lens. The lens may receive reflected light from a subject located within a viewing angle. According to some example embodiments, the lens assembly 100 may be arranged to face a particular direction (e.g. the front direction or the back direction of the electronic device 1). According to some example embodiments, the lens assembly 100 may include an aperture to adjust the amount of light input. The components included in the lens assembly 100, and the shape features between the components will be described later with reference to FIG. 3A and so on.

The actuator driving module 200 may drive an actuator of the lens assembly 100. In some example embodiments, the actuator driving module 200 may be a circuit, which provides voltage to the actuator. The actuator driving module 200 may change the position or the direction of the lens of the lens assembly 100, by driving the actuator.

The image stabilization module 310 may perform image stabilization of the camera module 10, to prevent image blur caused by hand tremble of the user during image capture. Although the image stabilization module 310 may be implemented as hardware, example embodiments of the image stabilization module 310 are not limited thereto. According to some other example embodiments, the image stabilization module 310 may be implemented as software executed by the controller 300. Therefore, the image stabilization module 310 performs the image stabilization function, which means that the controller 300 in the camera module 10 executes the image stabilization module 310. In addition, although the controller 300 including an image stabilization module 310 is shown in FIG. 2, example embodiments of the inventive concepts are not limited thereto. According to some other example embodiments, the controller 300 and the image stabilization module 310 may actually have the same configuration.

The image stabilization module 310 may calculate a target image stabilization value for moving the lens to stabilize image movement of the electronic device 1 or the camera module 10. The target image stabilization value may be a value corresponding to a movement distance in a first direction or a movement distance in a second direction for the image stabilization.

The lens assembly 100 may include a sensor for sensing the movement of the electronic device 1 or the camera module 10. In some example embodiments, the lens assembly 100 may further include a gyro sensor, wherein the gyro sensor may detect the movement of the electronic device 1 or the camera module 10 and transmit the detection result to the image stabilization module 310. The image stabilization module 310 may calculate the target image stabilization value based on the detection result. According to some example embodiments, the image stabilization module 310 may perform the image stabilization function by using the calculated target image stabilization value. For example, the image stabilization module 310 may control the actuator driving module 200 to change the position of the lens of the lens assembly 100, based on the calculated target image stabilization value.

The lens position sensor 400 may sense the position of the lens of the lens assembly 100. According to some example embodiments, the lens position sensor 400 may be implemented as a hall sensor. The lens position sensor 400 may sense the position of the lens of the lens assembly 100 and transmit position information of the sensed lens to the image stabilization module 310. Based on the position information, the image stabilization module 310 may check whether the image stabilization has been sufficiently performed, according to the movement of the lens (e.g., by confirming whether or not the position information of the lens coincides with the calculated target image stabilization value). In the case of insufficient image stabilization, a new target image stabilization value may be calculated to correct the error of the target image stabilization value.

The image sensor 500 may convert light input into an electrical signal through the lens assembly 100. For example, the image sensor 500 may generate an image using subject information in the light input, through the lens assembly 100. The image sensor 500 may transfer the generated image to the processor 20.

As the camera module 10 according to some example embodiments of the inventive concepts includes a piezoelectric actuator, the lens position sensor 400 does not need to include a separate magnetic field shielding structure, while the image stabilization module 310 does not need to consider the influence of the magnetic field by the actuator in calculating the target image stabilization value. Thus, some example embodiments of the inventive concepts have an advantage over conventional image stabilization techniques that it is not necessary to correct errors in a sensing operation of a sensor in order to accurately calculate the target image stabilization value. The image stabilization function performed by the camera module 10 will be described in detail later with reference to FIG. 8A.

Figure 3A:
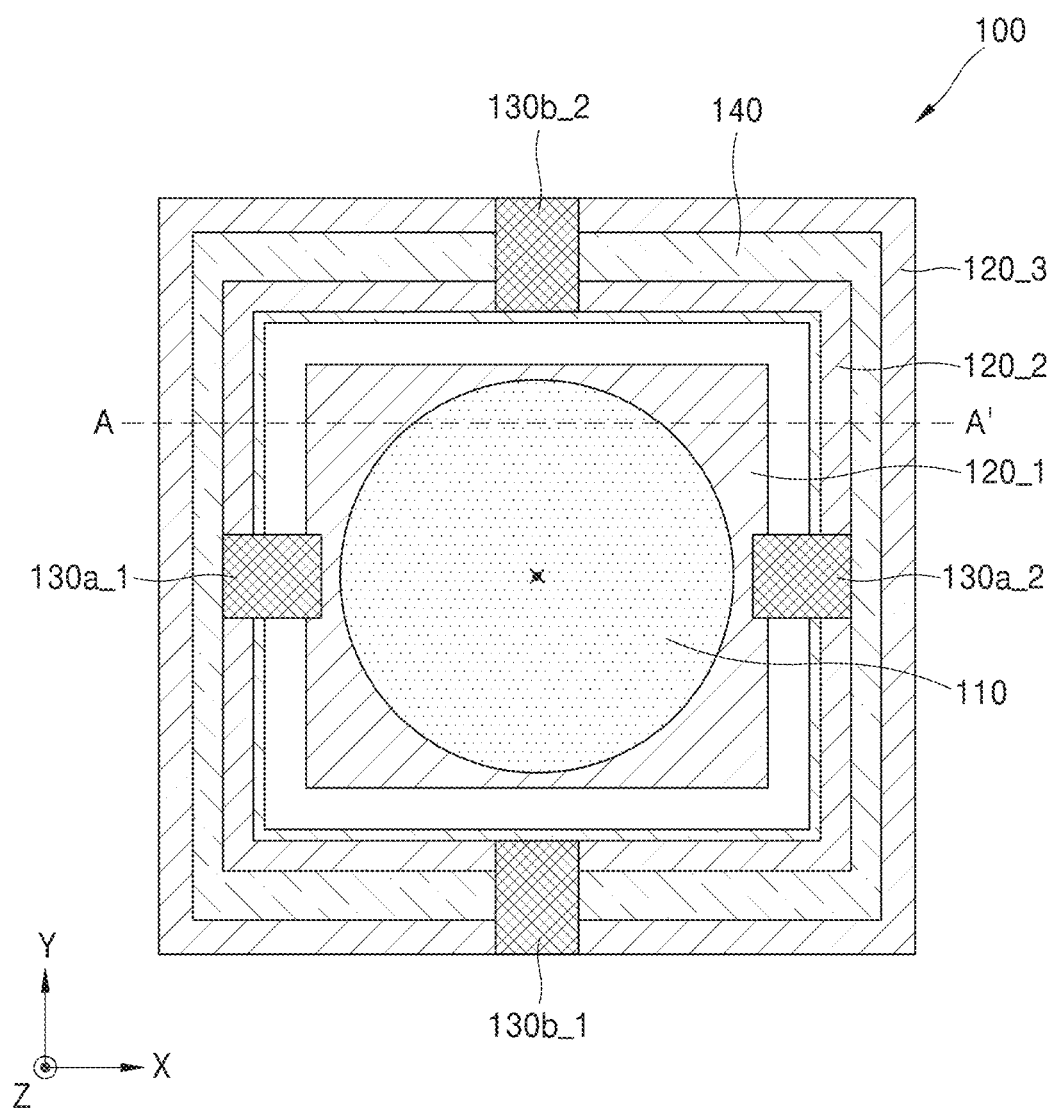
FIG. 3A illustrates a configuration of a lens assembly included in a camera module according to some example embodiments of the inventive concepts.
Figure 3B:
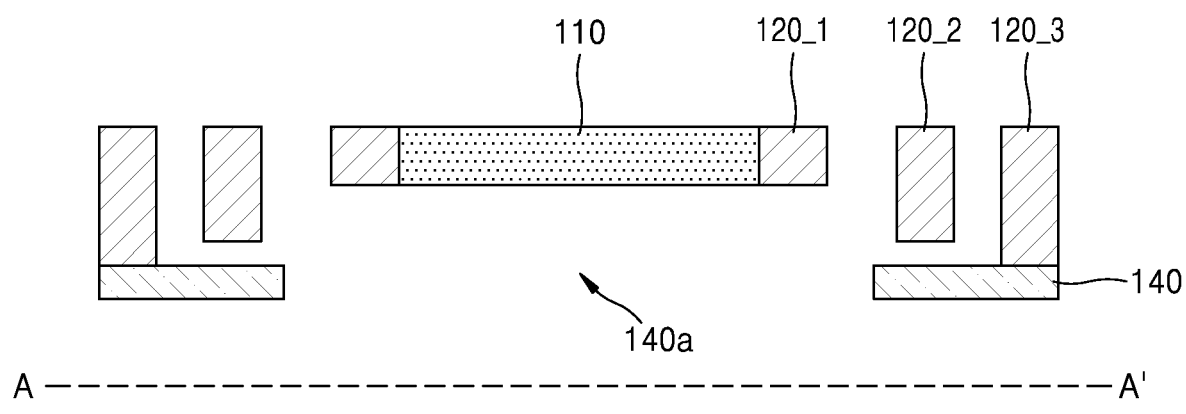
FIG. 3B is a cross-sectional view taken along line A-A' in FIG. 3A of a configuration of a lens assembly included in a camera module according to some example embodiments of the inventive concepts.

FIG. 3A illustrates a configuration of the lens assembly 100 in a camera module 10 according to some example embodiment of the inventive concepts. FIG. 3B is a cross-sectional view taken along line A-A' in FIG. 3A of a configuration of the lens assembly 100 in the camera module 10 according to some example embodiments of the inventive concepts.

Referring to FIG. 2, FIG. 3A, and FIG. 3B, the lens assembly 100 may include a lens 110, a first frame 120_1, a second frame 120_2, a third frame 120_3, a plurality of first actuators 130*a*_1 and 130*a*_2, and a plurality of second actuators 130*b*_1 and 130*b*_2. The plurality of first actuators 130*a*_1 and 130*a*_2, and the plurality of second actuators 130*b*_1 and 130*b*_2 may be piezoelectric actuators, respectively.

The lens 110 may be mounted on an optical axis (e.g. Z direction) of the image sensor (e.g. 500 in FIG. 2), wherein the optical axis may be the front direction or the back direction of the electronic device (e.g. the electronic device 1 in FIG. 1). The lens 110 may receive reflected light from a subject located within a viewing angle. In FIG. 3A, although only one lens 110 is shown, example embodiments of the lens assembly 100 are not limited thereto. According to some other example embodiments, the lens assembly 100 may include a plurality of lenses.

The first frame 120_1 may surround the lens 110 and may accommodate the lens 110 therein. The lens 110 may be inserted and fixed in the first frame 120_1.

The second frame 120_2 may surround the first frame 120_1 and may be apart from the first frame 120_1 in a first direction (e.g. X direction) and a second direction (e.g. Y direction) perpendicular to the optical axis. The first frame 120_1 and the second frame 120_2 may be arranged on a same plane perpendicular to the optical axis.

The third frame 120_3 may surround the second frame 120_2 and may be apart from the second frame 120_2 in the first direction X and the second direction Y perpendicular to the optional axis Z. The second frame 120_2 and the third frame 120_3 may be arranged on the same plane perpendicular to the optical axis. The third frame 120_3 may be fixed to another component of the camera module 10 arranged on the exterior of the lens assembly 100.

The lens assembly 100 may further include a base plate 140. In some example embodiments, the base plate 140 may include a hole 140*a* formed at the center thereof so that the lens 110 and the first frame 120_1 may move in an optical axis direction Z. The third frame 120_3 may be supported and fixed by the base plate 140.

The second frame 120_2 and the third frame 120_3 may have a quadrangle shape. For example, the second frame 120_2 and the third frame 120_3 may be a quadrangle in which two opposing sides are parallel to each other, wherein two sides may be parallel to the first direction X and two sides may be parallel to the second direction Y. For example, the second frame 120_2, and the third frame 120_3 may include two pillars extending in the first direction X and two pillars extending in the second direction Y. As shown in FIG. 3A and FIG. 3B, although the second frame 120_2 and the third frame 120_3 may both have a quadrangular pillar shape with four pillars, example embodiments of the inventive concepts are not limited thereto.

As the second frame 120_2 and the third frame 120_3 have a quadrangle shape, as seen from above, the first frame 120_1 or the second frame 120_2 may move in a same direction by a force from the plurality of first actuators 130*a*_1 and 130*a*_2, or the plurality of second actuators 130*b*_1 and 130*b*_2.

Each of the plurality of first actuators 130*a*_1 and 130*a*_2 may be arranged in parallel in the first direction X. Each of the plurality of first actuators 130*a*_1 and 130*a*_2 may be arranged to be in contact with the first frame 120_1 and the second frame 120_2, wherein the first frame 120_1 may connect with the second frame 120_2, and the first frame 120_1 may attach to the second frame 120_2.

The plurality of first actuators 130*a*_1 and 130*a*_2 may expand or contract when a voltage is applied to the plurality of first actuators 130*a*_1 and 130*a*_2. Therefore, the distance between the first frame 120_1 and the second frame 120_2 in the first direction X may vary as the shapes of each of the plurality of first actuators 130*a*_1 and 130*a*_2 change. The image stabilization module 310 may control the voltage provided to each of the plurality of first actuators 130*a*_1 and 130*a*_2, by controlling the actuator driving module 200. Furthermore, the distance between the first frame 120_1 and the second frame 120_2 in the first direction X may also be controlled.

Each of the plurality of second actuators 130*b*_1 and 130*b*_2 may be arranged in parallel in the second direction Y. Each of the plurality of second actuators 130*b*_1 and 130b_2 may be arranged to be in contact with the second frame 120_2 and the third frame 120_3, wherein the second frame 120_2 may connect with the third frame 120_3, and the second frame 120_2 may attach to the third frame 120_3. Although the first direction X and the second direction Y may be perpendicular to each other, example embodiments of the first direction X and the second direction Y are not limited thereto.

The distance between the second frame 120_2 and the third frame 120_3 in the second direction Y may vary due to the change of the shapes of each of the plurality of second actuators 130b_1 and 130b_2. The image stabilization module 310 may control the voltage provided to each of the plurality of second actuators 130b_1 and 130b_2, by controlling the actuator driving module 200. Furthermore, the distance between the second frame 120_2 and the third frame 120_3 in the second direction Y may be controlled.

Therefore, the position of the lens 110 accommodated in the first frame 120_1 may be changed by the plurality of first actuators 130a_1 and 130a_2 and the plurality of second actuators 130b_1 and 130b_2. In the case where an image may be distorted by the hand tremble of the user, the camera module 10 may use the plurality of first actuators 130a_1 and 130a_2, and the plurality of second actuators 130b_1 and 130b_2, to change the position of the lens 110 to correct the influence of hand tremble of the user.

A particular example of the operation of the plurality of first actuators 130a_1 and 130a_2 will be described later with reference to FIG. 4A, while a particular example of the operation of the plurality of second actuators 130b_1 and 130b_2 will be described later with reference to FIG. 4B.

In FIG. 3A, although the plurality of first actuators 130a_1 and 130a_2 arranged in parallel in the first direction X are shown as connecting the first frame 120_1 to the second frame 120_2, example embodiments of the plurality of first actuators 130a_1 and 130a_2 are not limited thereto. According to some other example embodiments, the plurality of second actuators 130b_1 and 130b_2 arranged in parallel in the second direction Y may connect the first frame 120_1 to the second frame 120_2, while the plurality of first actuators 130a_1 and 130a_2 arranged in parallel in the first direction X may connect the second frame 120_2 to the third frame 120_3.

In FIG. 3A, although two first actuators and two second actuators are shown, example embodiments of the camera module 10 are not limited thereto. According to some other example embodiments, the camera module 10 may include a greater number of first actuators and second actuators.

Figure 3C:
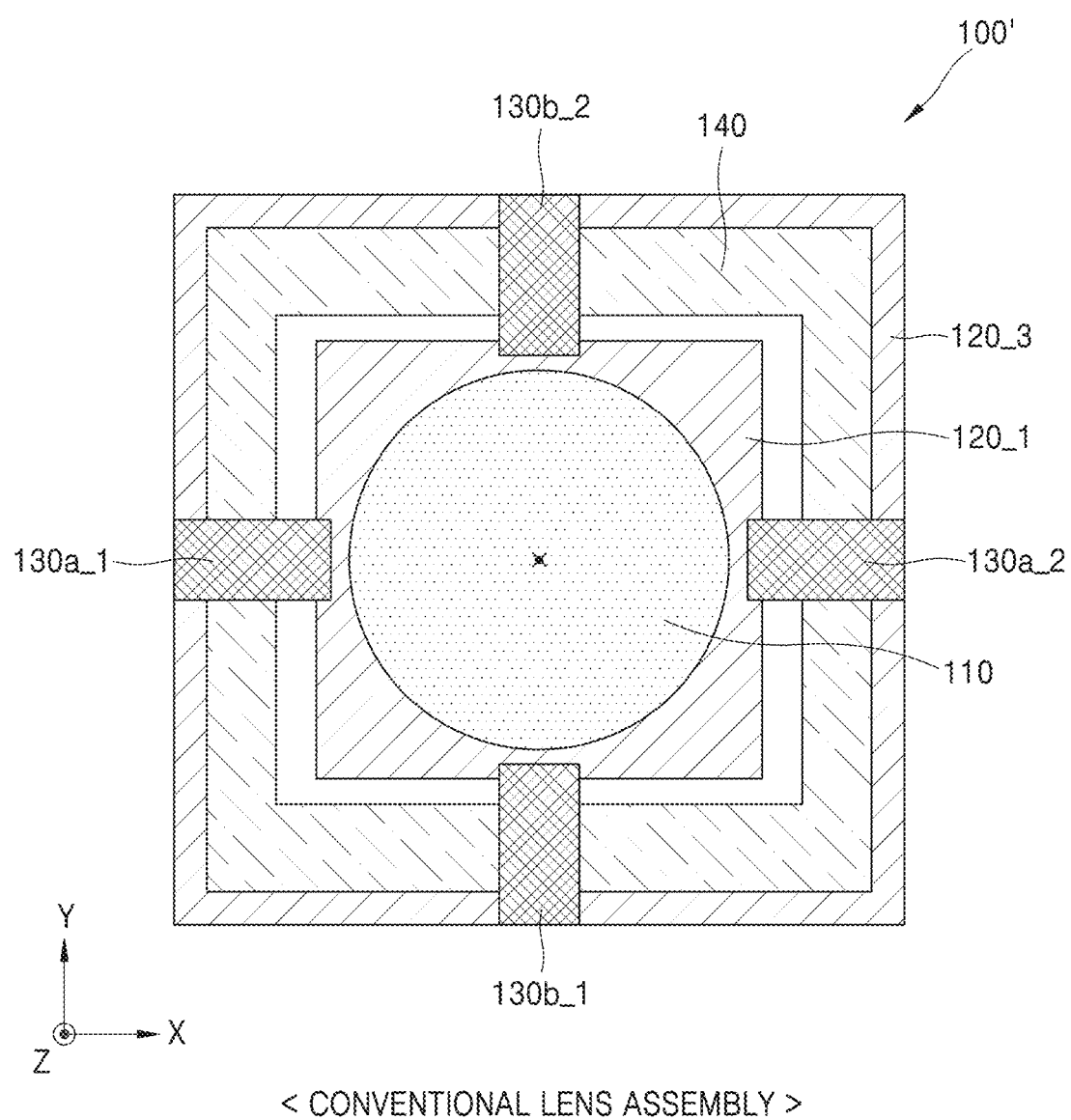
FIG. 3C illustrates a configuration of a conventional lens assembly.

FIG. 3C illustrates a configuration of a conventional lens assembly.

Referring to FIG. 3A and FIG. 3C, in contrast to the lens assembly 100 according to some example embodiments of the inventive concepts, a conventional lens assembly 100', which is without the second frame 120_2 of the lens assembly 100, connects with the plurality of first actuators 130a_1 and 130a_2, which are arranged between the first frame 120_1 configured to fix the lens 110 and the third frame 120_3 fixed to another configuration component of an exterior portion of the conventional lens assembly 100', and the plurality of second actuators 130b_1 and 130b_2. In the conventional lens assembly 100', the elements that support the lens 110 and the first frame 120_1 are the third frame 120_3, the plurality of first actuators 130a_1 and 130a_2, and the plurality of second actuators 130b_1 and 130b_2, which are fewer elements than those of the lens assembly 100 according to some example embodiments of the inventive concepts.

Therefore, under the circumstance that the position of the lens 110 is adjusted by adjusting the relative distance between the third frame 120_3 and the first frame 120_1 of the conventional lens assembly 100', the lens 110, due to the operation of the plurality of first actuators 130a_1 and 130a_2, may be moved not only in the first direction X but also in the second direction Y unintentionally. In addition, when the plurality of second actuators 130b_1 and 130b_2 of the conventional lens assembly 100' operate, the lens 110 may be moved not only in the second direction Y, but also in the first direction X unintentionally. That is, the movement of the lens 110 in the first direction X and the movement of the lens 110 in the second direction Y are not independent, due to the position of the lens 110 being changed, which has a problem of affecting each other.

According to the conventional lens assembly 100' of FIG. 3C, when an actuator is directly connected between a frame which is fixed on external parts of a camera module and a frame housing the lens, the accuracy of controlling shake in a desired direction is low, since the control in the first direction X and the control in the second direction Y influence each other.

In contrast to the conventional lens assembly 100' of FIG. 3C, the lens assembly 100 according to some example embodiments of the inventive concepts may further include the second frame 120_2 between the first frame 120_1 and the third frame 120_3. By connecting the plurality of first actuators 130a_1 and 130a_2 between the first frame 120_1 and the second frame 120_2, and connecting the plurality of second actuators 130b_1 and 130b_2 between the second frame 120_2 and the third frame 120_3, an object directly moving by the plurality of first actuators 130a_1 and 130a_2 and an object directly moving by the plurality of second actuators 130b_1 and 130b_2 may be configured to be different from each other. That is, the movement of the lens 110 in the first direction X and the movement of the lens 110 in the second direction Y may be independently performed without affecting each other, the lens 110 may be moved to correspond to the target image stabilization value calculated by the image stabilization module 310, and the stabilization error between the target image stabilization value and the actual distance of the movement of the lens 110 may be reduced. Therefore, the lens assembly 100 according some example embodiments of the inventive concepts has an advantage over the conventional lens assembly 100' of FIG. 3C, in that the time taken for the image stabilization module 310 to stabilize the shake may be reduced while also improving accuracy of the image stabilization method as compared to the conventional lens assembly 100'.

Figure 4A:
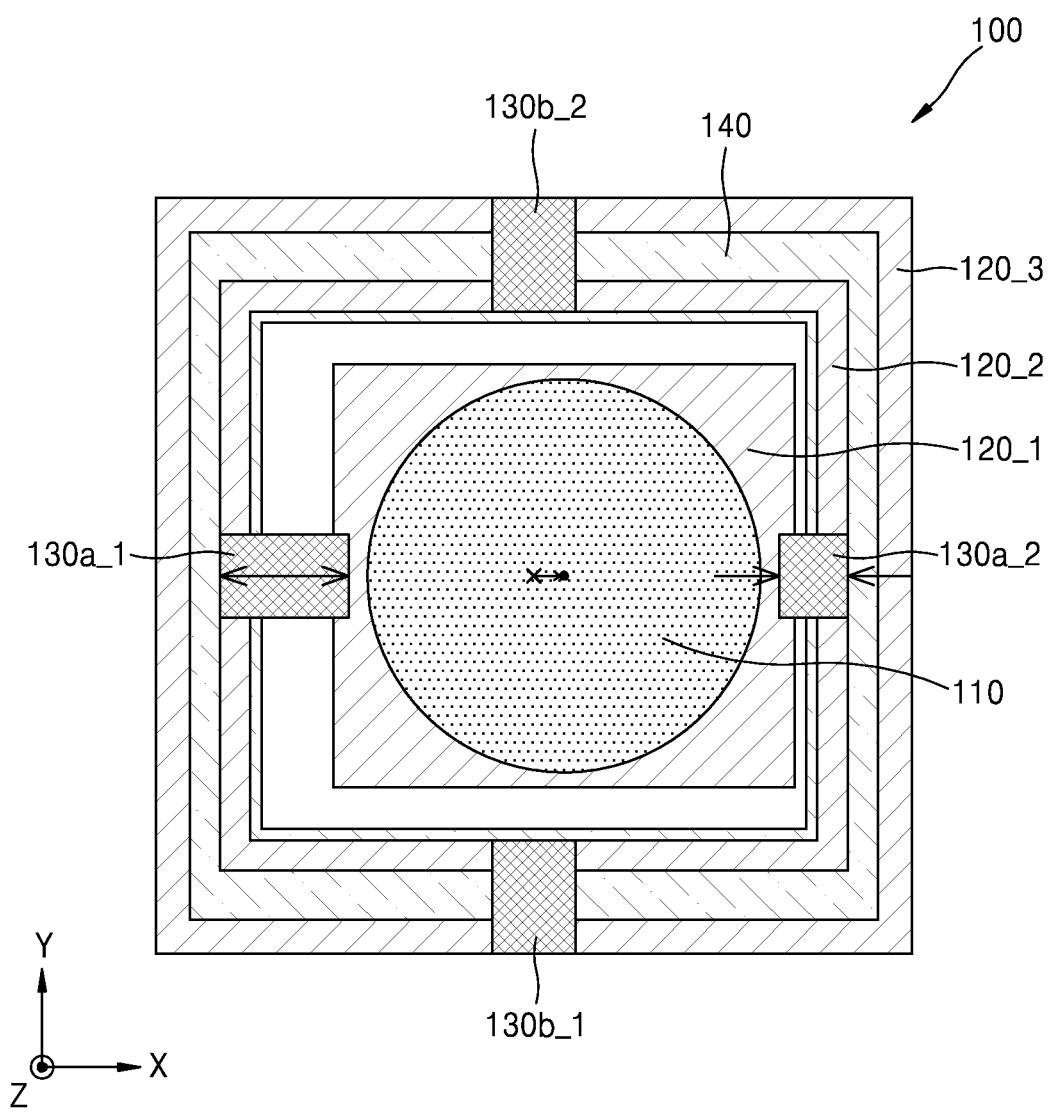
FIG. 4A illustrates an operation of a plurality of first actuators included in a camera module according to some example embodiments of the inventive concepts.

FIG. 4A illustrates an operation of the plurality of actuators in the camera module 10 according to some example embodiments of the inventive concepts. FIG. 4A shows the operation of the plurality of first actuators 130a_1 and 130a_2, for moving the position of lens 110 in the first direction X.

Referring to FIG. 2 and FIG. 4A, when the camera module 10 or the electronic device 1 is shaken by the user, the image stabilization module 310 may calculate the target image stabilization value, based on information about the motion of the electronic device 1 or the camera module 10, for stabilizing the shake. The target image stabilization value may correspond to information about the changed position of the lens 110.

In some example embodiments, when the camera module 10 or the electronic device 1 is shaken in the first direction X and a reverse direction −X of the first direction X, the image stabilization module 310 may control the actuator driving module 200 to move the lens 110 in a direction opposite to the shaking direction to compensate for the shake. For example, when the camera module 10 or the electronic device 1 moves in the reverse direction −X of the first direction X, the actuator driving module 200 may drive the plurality of first actuators 130a_1 and 130a_2 to move the lens 110 in the first direction X. Alternatively, when the camera module 10 or the electronic device 1 moves in the first direction X, the actuator driving module 200 may drive the plurality of first actuators 130a_1 and 130a_2 to move the lens in the reverse direction −X.

Each of the plurality of first actuators 130a_1 and 130a_2 may be arranged in parallel in the first direction X. Each of the plurality of first actuators 130a_1 and 130a_2 may be arranged in contact with the first frame 120_1 and the second frame 120_2, wherein each of the plurality of first actuators 130a_1 and 130a_2 may connect with the first frame 120_1 and the second frame 120_2. Therefore, by contracting or expanding the plurality of first actuators 130a_1 and 130a_2, the distance between the first frame 120_1 and the second frame 120_2 in the first direction X or the reverse direction −X may be changed. The accommodation of the lens in the first frame 120_1 may change the position of the lens 110 together with the first frame 120_1.

The plurality of first actuators 130a_1 and 130a_2 may include a pair of a first actuator 130a_2 arranged in the first direction X and a first actuator 130a_1 arranged in the reverse direction −X of the first direction X, respectively, with reference to the lens 110.

Each of the plurality of first actuators 130a_1 and 130a_2 may operate complementarily with each other. For example, the first actuator 130a_1 may expand, and the other first actuator 130a_2 may contract. That is, if one first actuator 130a_1 increases the distance between the first frame 120_1 and the second frame 120_2, the other first actuator 130a_2 may reduce the distance between the first frame 120_1 and the second frame 120_2. Alternatively, the first actuator 130a_2 may expand and the first actuator 130a_1 may contract, such that the first actuator 130a_2 increases the distance between the first frame 120_1 and the second frame 120_2 while the first actuator 130a_1 reduces the distance between the first frame 120_1 and the second frame 120_2. Therefore, the position of the lens 110 may be moved in the first direction X and the reverse direction −X by twice the force as compared with the case including a single first actuator, and the movement of the lens 110 in the first direction X and the reverse direction −X may be more stable as compared with the case including a single first actuator. In addition, the lens 110 may be moved in the first direction X and the reverse direction −X, by arranging the plurality of first actuators 130a_1 and 130a_2 in the first direction X and the reverse direction −X of the first direction X, respectively.

In some example embodiments, each of the plurality of first actuators 130a_1 and 130a_2 may have a driving frequency from several kHz to dozens of kHz. Therefore, a compensation for hand tremble vibrating from several kHz to dozens of kHz in the first direction X and the reverse direction −X of the first direction X may be performed.

Figure 4B:
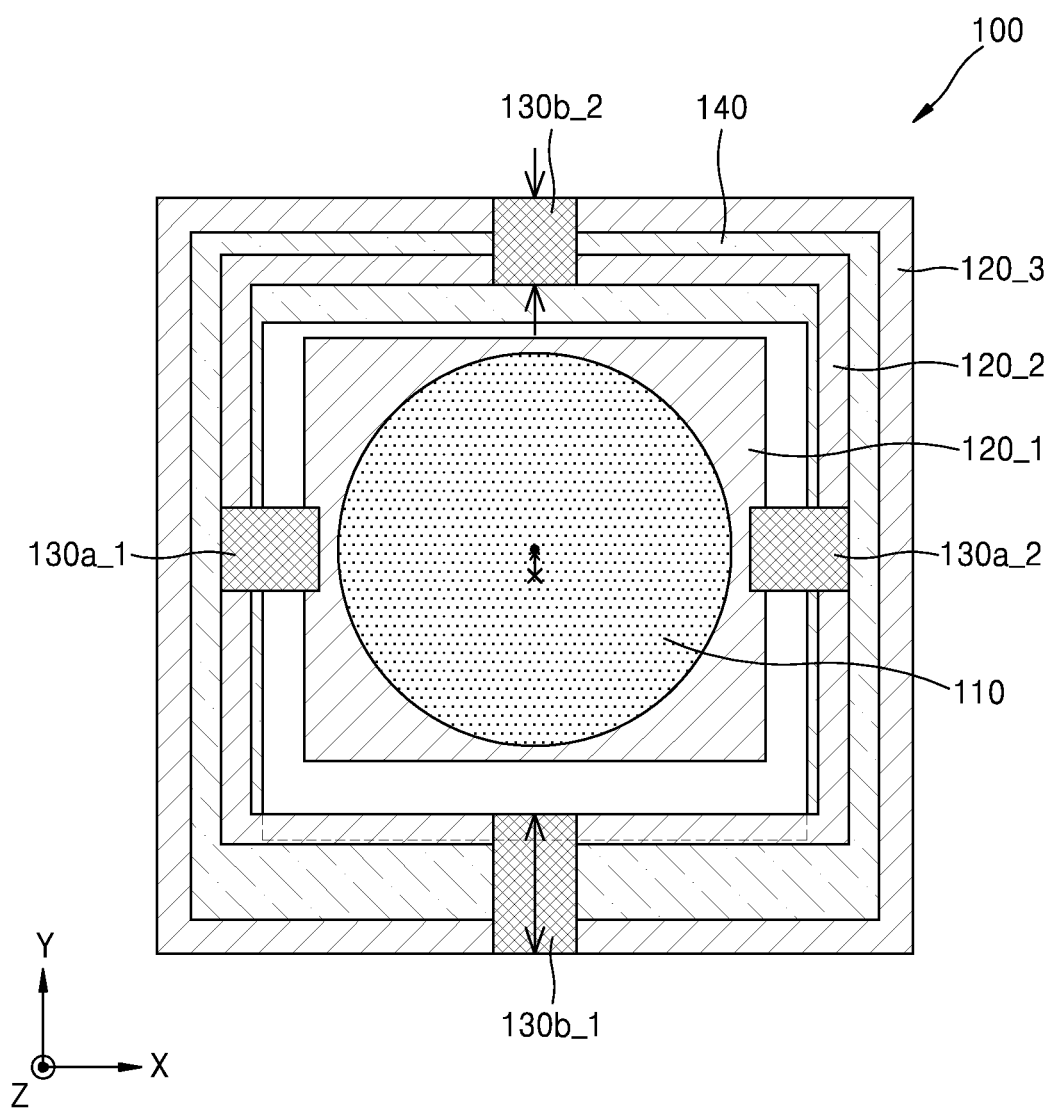
FIG. 4B illustrates an operation of a plurality of second actuators included in a camera module according to some example embodiments of the inventive concepts.

FIG. 4B illustrates an operation of the plurality of second actuators in the camera module 10 according to some example embodiments of the inventive concepts. FIG. 4B shows the operation of the plurality of second actuators 130b_1 and 130b_2 for moving the position of lens 110 in the second direction Y.

Referring to FIG. 2 and FIG. 4B, when the camera module 10 or the electronic device 1 is shaken in the second direction Y and a reverse direction −Y of the second direction Y, the image stabilization module 310 may control the actuator driving module 200 to move the lens 110 in a direction opposite to the shaking direction to compensate for the shake. For example, if the camera module 10 or the electronic device 1 moves in the reverse direction −Y of the second direction Y, the actuator driving module 200 may drive the plurality of second actuators 130b_1 and 130b_2 to move the lens 110 in the second direction Y. Alternatively, when the camera module 10 or the electronic device 1 moves in the second direction Y, the actuator driving module 200 may drive the plurality of second actuators 130b_1 and 130b_2 to move the lens in the reverse direction −Y.

Each of the plurality of second actuators 130b_1 and 130b_2 may be arranged in parallel in the second direction Y. Each of the plurality of second actuators 130b_1 and 130b_2 may be arranged in contact with the second frame 120_2 and the third frame 120_3, wherein each of the plurality of second actuators 130b_1 and 130b_2 connects with the second frame 120_2 and the third frame 120_3. Therefore, the distance between the second frame 120_2 and the third frame 120_3 in the second direction Y or the reverse direction −Y may be changed by contracting or expanding the plurality of second actuators 130b_1 and 130b_2, respectively.

As the third frame 120_3 is fixed to another component (for example, a housing) of the camera module 10, the position of the second frame 120_2 may be changed with reference to the fixed position of the third frame 120_3, by the plurality of second actuators 130b_1 and 130b_2. Accordingly, the first frame 120_1 and the lens 110 accommodated in the second frame 120_2 may together move in the second direction Y and the reverse direction −Y.

The plurality of second actuators 130b_1 and 130b_2 may include a pair of a second actuator 130b_2 arranged in the second direction Y and a second actuator 130b_1 arranged in the reverse direction −Y of the second direction Y, respectively, with reference to the lens 110.

Each of the plurality of second actuators 130b_1 and 130b_2 may operate complimentarily with each other. For example, the second actuator 130b_1 may expand, and the other second actuator 130b_2 may contract. That is, if one second actuator 130b_1 increases the distance between the second frame 120_2 and the third frame 120_3, the other second actuator 130b_2 may reduce the distance between the second frame 120_2 and the third frame 120_3. Alternatively, the second actuator 130b_2 may expand and the second actuator 130b_1 may contract, such that the second actuator 130b_2 increases the distance between the second frame 120_2 and the third frame 120_3 while the second actuator 130b_1 reduces the distance between the second frame 120_2 and the third frame 120_3. Therefore, the position of the lens 110 may be moved in the second direction Y and the reverse direction −Y by twice the force as compared with the case including a single second actuator, and the movement of the lens 110 in the second direction Y may be more stable as compared with the case including a single second actuator. In addition, the lens 110 may be moved in the second direction Y and the reverse direction −Y, by arranging the plurality of second actuators 130b_1 and 130b_2 in the second direction Y and the reverse direction −Y of the first direction X, respectively.

In some example embodiments, each of the plurality of second actuators 130b_1 and 130b_2 may have a driving frequency from several kHz to dozens of kHz. Therefore, a compensation for hand tremble vibrating from several kHz to dozens of kHz in the second direction Y and the reverse direction −Y of the second direction Y may be performed.

Referring to FIG. 4A and FIG. 4B, the lens assembly 100 according to some example embodiments of the inventive concepts may include the plurality of first actuators 130*a*_1 and 130*a*_2 and the plurality of second actuators 130*b*_1 and 130*b*_2, which are arranged in parallel to each other in the opposite direction, with reference to the center of the lens 110. In some example embodiments, the first direction X and the second direction Y may be perpendicular to each other.

The camera module 10 may adjust voltages applied to the plurality of first actuators 130*a*_1 and 130*a*_2 and the plurality of second actuators 130*b*_1 and 130*b*_2, respectively, depending on the direction in which the camera module 10 or the electronic device 1 is being shaken. The camera module 10 may compensate for the shake due to hand tremble, by adjusting the degree to which each actuator contracts or expands, respectively.

However, according to some example embodiments, the plurality of first actuators 130*a*_1 and 130*a*_2 may simultaneously move the first frame 120_1 and the lens 110, while the plurality of second actuators 130*b*_1 and 130*b*_2 may simultaneously move the second frame 120_2, the first frame 120_1, and the lens 110. Therefore, assuming that the lens 110 is moved by the same distance in the first direction X and the second direction Y, the plurality of second actuators 130*b*_1 and 130*b*_2 may be controlled to contract or expand with a stronger force than the plurality of first actuators 130*a*_1 and 130*a*_2, respectively. In some example embodiments, when the lens 110 is moved by the same distance in the first direction X and the second direction Y, the camera module 10 may apply a larger voltage to the plurality of second actuators 130*b*_1 and 130*b*_2 than to the plurality of first actuators 130*a*_1 and 130*b*_2.

Figure 5:
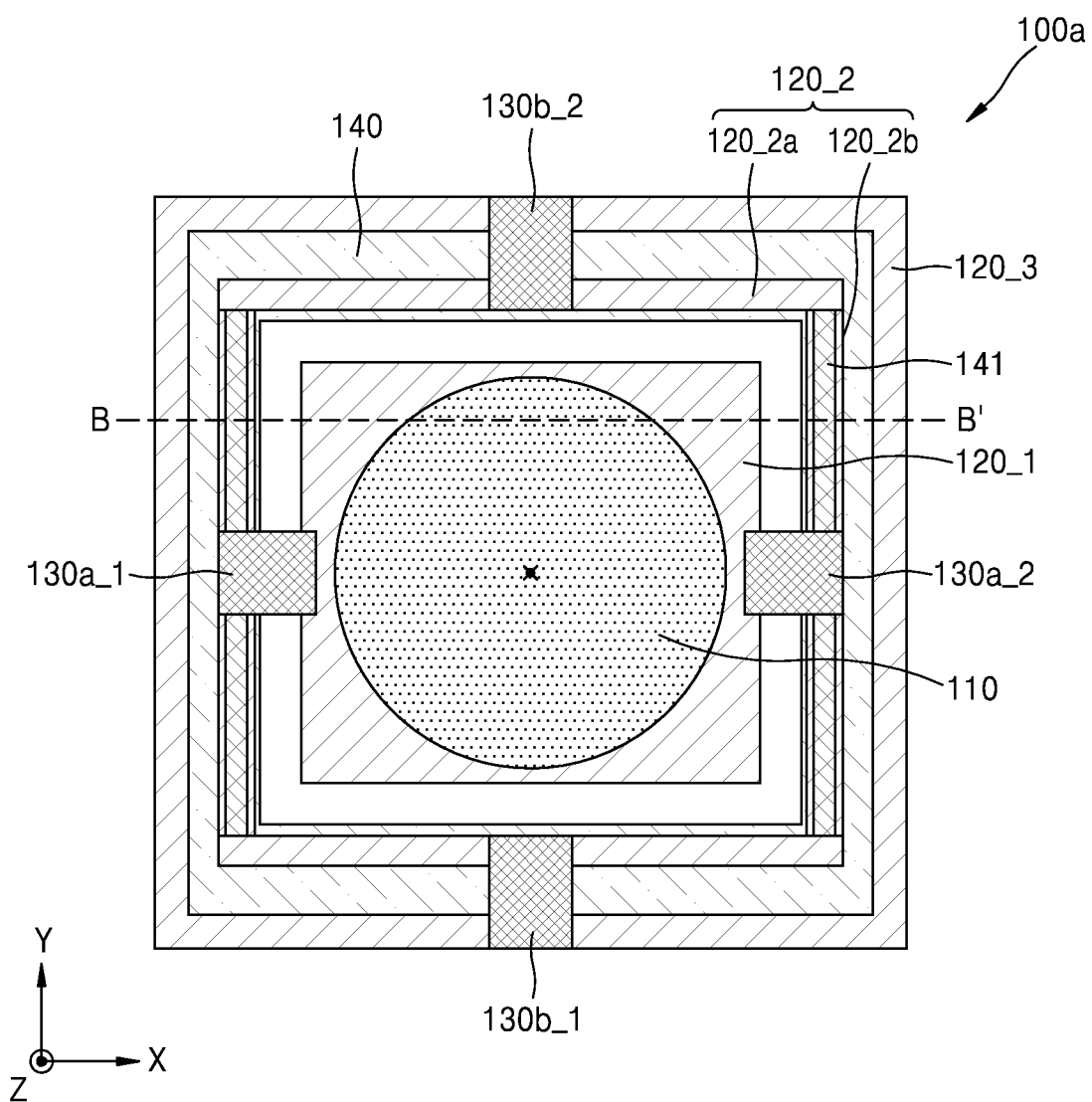
FIG. 5 illustrates a configuration of a lens assembly included in a camera module according to some example embodiments of the inventive concepts.
Figure 6:
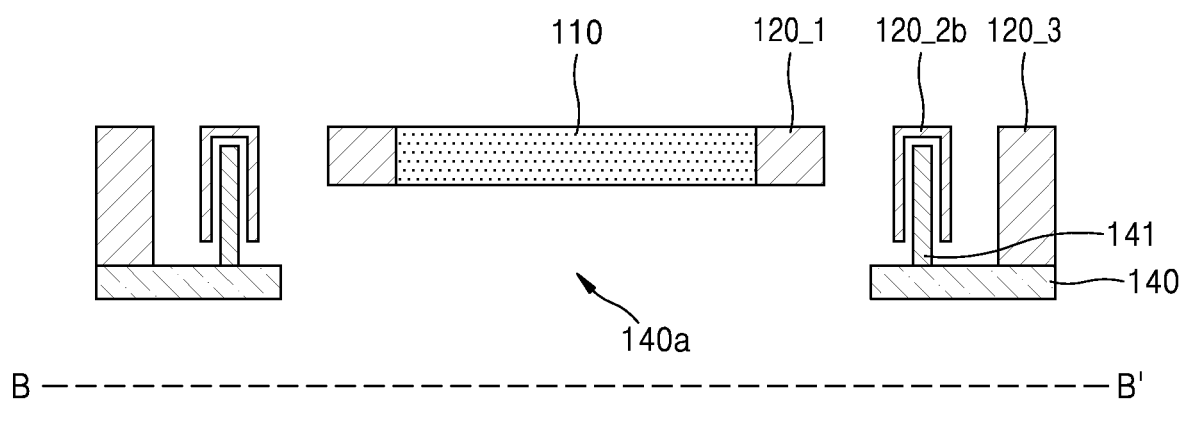
FIG. 6 illustrates a cross-sectional view taken along line B-B' in FIG. 5 of a configuration of a lens assembly included in a camera module according to some example embodiments of the inventive concepts.

FIG. 5 illustrates a configuration of a lens assembly in the camera module 10 according to some example embodiments of the inventive concepts. FIG. 6 is a cross-sectional view taken along line B-B' in FIG. 5, of a configuration of a lens assembly in a camera module according to some example embodiments of the inventive concepts. The overlapped description in FIG. 5 with the configurations that overlap with those in FIG. 3A will be skipped.

Referring to FIG. 5 and FIG. 6, a lens assembly 100*a* may include a lens 110, a first frame 120_1, a second frame 120_2, a third frame 120_3, a plurality of first actuators 130*a*_1 and 130*a*_2, a plurality of second actuators 130*b*_1 and 130*b*_2, and a guard rail 141.

In some example embodiments, the second frame 120_2 may have a quadrangular shape and include a first portion 120_2*a* parallel to the first direction X and a second portion 120_2*b* parallel to the second direction Y. The shapes of the first portion 120_2*a* and the second portion 120_2*b* of the second frame 120_2 may be different from each other. For example, the first portion 120_2*a* may have a pillar shape (for example, a quadrangular pillar shape) extending in the first direction X, as in the cross-section of the second frame 120_2 of FIG. 3B.

On the other hand, the second portion 120_2*b* may extend in the second direction Y, and at least some of the second portion 120_2*b* may have a shape including a groove in the second portion 120_2*b*.

The guard rail 141 may have a shape protruding from the base plate 140. The guard rail 141 may extend in the second direction Y and be arranged in the groove in the second portion 120_2*b* of the second frame 120_2. That is, at least some of the second portion 120_2*b* may be mounted to cover the guard rail 141. Therefore, the guard rail 141 may be arranged in a region in the second frame 120_2, where the second portion 120_2*b* parallel to the second direction Y is arranged. For example, the guard rail 141 may be arranged to overlap with at least a part of the second portion 120_2*b* in the optical axis direction Z.

On the other hand, the guard rail 141 may not be arranged in a region in the second frame 120_2, where the first portion 120_2*a* parallel to the first direction X is arranged. For example, the guard rail 141 may not overlap with the first portion 120_2*a* in the optical axis direction Z.

The guard rail 141 may perform a function of restricting the movement of the second frame 120_2. In some example embodiments, the guard rail 141 may restrict the movement of the second frame 120_2 in the first direction X, by being arranged only in the region where the second portion 120_2*b* is arranged. Therefore, when the plurality of second actuators 130*b*_1 and 130*b*_1 are driven, the second frame 120_2 may be configured to move in the second direction Y only, without unintentional movement in the first direction X in contrast to the conventional lens assembly 100' of FIG. 3C.

In some example embodiments, a ball bearing device (not illustrated) is further mounted between the guard rail 141 and the second portion 120_2*b* of the second frame 120_2 to smoothen the movement of the second frame 120_2 in the second direction Y.

In FIG. 5 and FIG. 6, although the second portion 120_2*b* of the second frame 120_2 is illustrated as being mounted to surround the guard rail 141, example embodiments of the inventive concepts are not limited to thereto. According to some other example embodiments, when the plurality of first actuators 130*a*_1 and 130*a*_2 arranged in parallel in the first direction X are arranged between the second frame 120_2 and the third frame 120_3, and the plurality of second actuators 130*b*_1 and 130*b*_2 arranged in parallel in the second direction Y are arranged between the first frame 120_1 and the second frame 120_2, the second portion 120_2*b* may have a pillar shape (for example, a quadrangular pillar shape) extending in the second direction Y, on the other hand, at least part of the first portion 120_2*a* of the second frame 120_2 may have a shape of including a groove in the first portion 120_2*a*. In this case, the first portion 120_2*a* of the second frame 120_2 may be mounted to surround the guard rail 141, and the movement of the second frame 120_2 in the second direction Y may be restricted by arranging the guard rail 141 in the groove in the first portion 120_2*a*.

In addition, as at least part of the second portion 120_2*b* of the second frame 120_2 has a shape covering the upper part of the guard rail 141, the movement of the second frame 120_2 in the first direction X is restricted by the guard rail 141. However, examples embodiments of the inventive concepts are not limited thereto. According to some other example embodiments, the guard rail 141 may have various other shapes that may restrict the movement of the second frame 120_2 in the first direction X.

The lens assembly 100*a* according to some example embodiments of the inventive concepts may fix the second frame 120_2, and may be implemented such that only the lens 110 moves by including the guard rail 141, when the plurality of first actuators 130*a*_1 and 130*a*_2 are driven.

Due to the formation of a plurality of frames surrounding the lens (including the second frame 120_2, which is not included in the conventional lens assembly 100' of FIG. 3C), and the formation of guard rails which are relatively arranged inside one of the frames (e.g., the second frame 120_2), the position of the lens may be accurately controlled by independently controlling the movement in the first direction X and the second direction Y, respectively. Therefore, according to some example embodiments of the inventive concepts, the image stabilization module 310 may improve the accuracy of the target image stabilization value calculated for image-stabilizing the shake, reduce the stabilization error, and increase the speed of performing the image stabilization function, as compared to a conventional image stabilization module for controlling the conventional lens assembly 100' of FIG. 3C.

Figure 7:
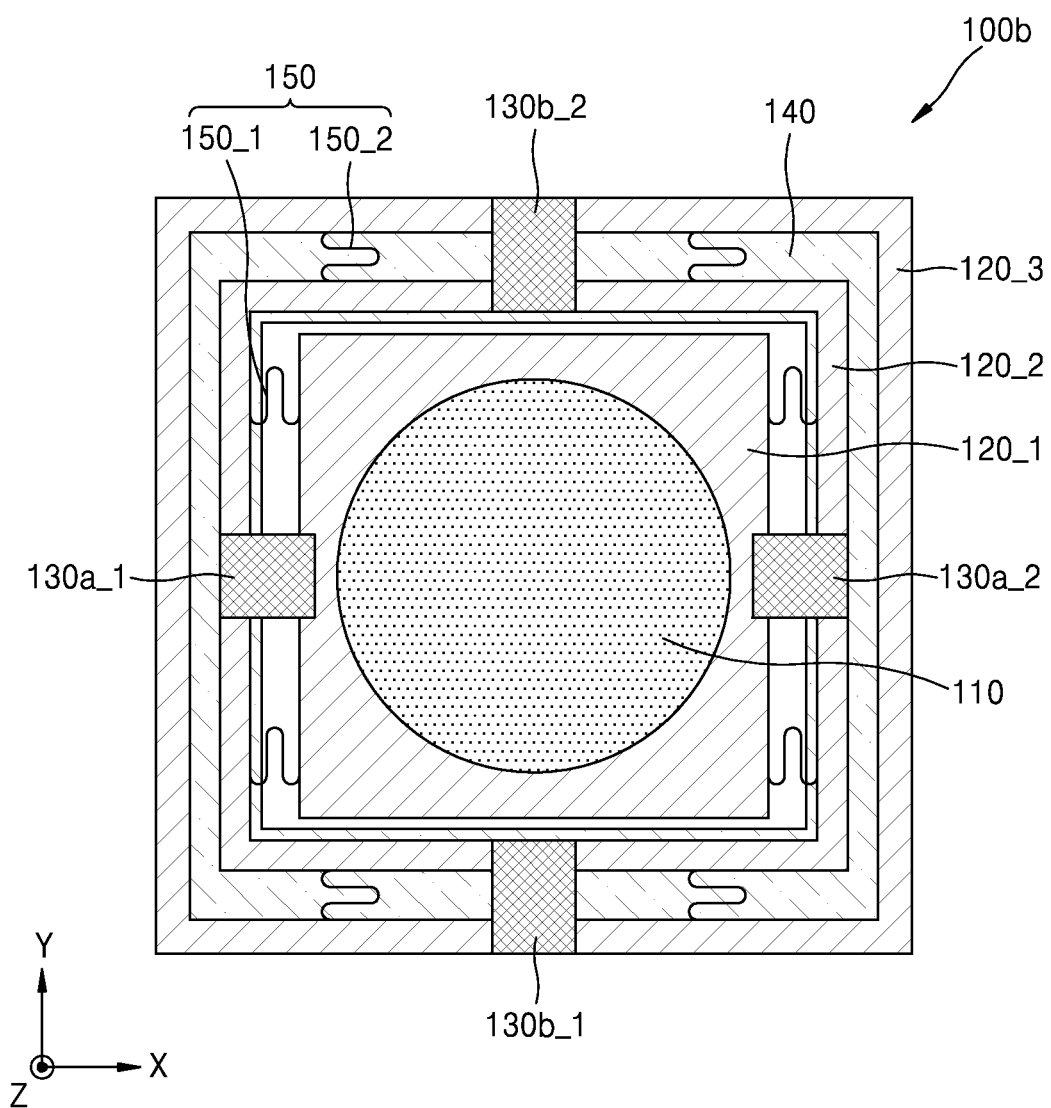
FIG. 7 illustrates a configuration of a lens assembly included in a camera module according to some example embodiments of the inventive concepts.

FIG. 7 illustrates a configuration of a lens assembly in the camera module 10 according to some example embodiments of the inventive concepts. The overlapped description in FIG. 7 with the configurations that overlap with those in FIG. 3A will be skipped.

Referring to FIG. 7, a lens assembly 100b may include a lens 110, a first frame 120_1, a second frame 120_2, a third frame 120_3, a plurality of first actuators 130a_1 and 130a_2, a plurality of second actuators 130b_1 and 130b_1, and a plurality of elastic members 150.

The plurality of elastic members 150 may include a plurality of first elastic members 150_1 arranged between the first frame 120_1 and the second frame 120_2, and a plurality of second elastic members 150_2 arranged between the second frame 120_2 and the third frame 120_3. The plurality of elastic members 150 may smoothen the movement of the first frame 120_1 and the second frame 120_2, by providing an elastic force between the first frame 120_1 and the second frame 120_2, and between the second frame 120_2 and the third frame 120_3, respectively.

In some example embodiments, the plurality of first elastic members 150_1 may be arranged in parallel to the plurality of first actuators 130a_1 and 130a_2 in the second direction Y, and may provide an elastic force in the first direction X. Therefore, the plurality of first elastic members 150_1 may help smoothen the movement of the first frame 120_1 and the lens 110 when the plurality of first actuators 130a_1 and 130a_2 operate.

In some example embodiments, the plurality of second elastic members 150_2 may be arranged in parallel to the plurality of second actuators 130b_1 and 130b_2 in the first direction X, and may provide an elastic force in the second direction Y. Therefore, the plurality of second elastic members 150_2 may help smoothen the movement of the second frame 120_2, the first frame 120_1, and the lens 110 when the plurality of second actuators 130b_1 and 130b_2 operate.

In some example embodiments, the first frame 120_1, the second frame 120_2, and the third frame 120_3 may include the same material. The first frame 120_1, the second frame 120_2, and the third frame 120_3 may accurately configure the movement of the first frame 120_1 and the second frame 120_2 in the first direction X or the second direction Y, by being formed with a relatively hard material. On the other hand, the plurality of elastic members 150 may be include a different material from the first frame 120_1, the second frame 120_2, and the third frame 120_3, and may be formed with a relatively flexible material such that the movement of the first frame 120_1 and the second frame 120_2 is not disturbed due to the plurality of elastic members 150.

However, example embodiments of the inventive concepts are not limited thereto. In some other example embodiments, the first frame 120_1, the second frame 120_2, the third frame 120_3, and the plurality of elastic members 150 may include the same material. In addition, the first frame 120_1, the second frame 120_2, the third frame 120_3, and the plurality of elastic members 150 may be manufactured in one process by using the same material. Therefore, the process of manufacturing the lens assembly 100b may be relatively more simple as compared to the case where the plurality of elastic members 150 are manufactured using a different material from the first frame 120_1, the second frame 120_2, and the third frame 120_3.

Figure 8A:
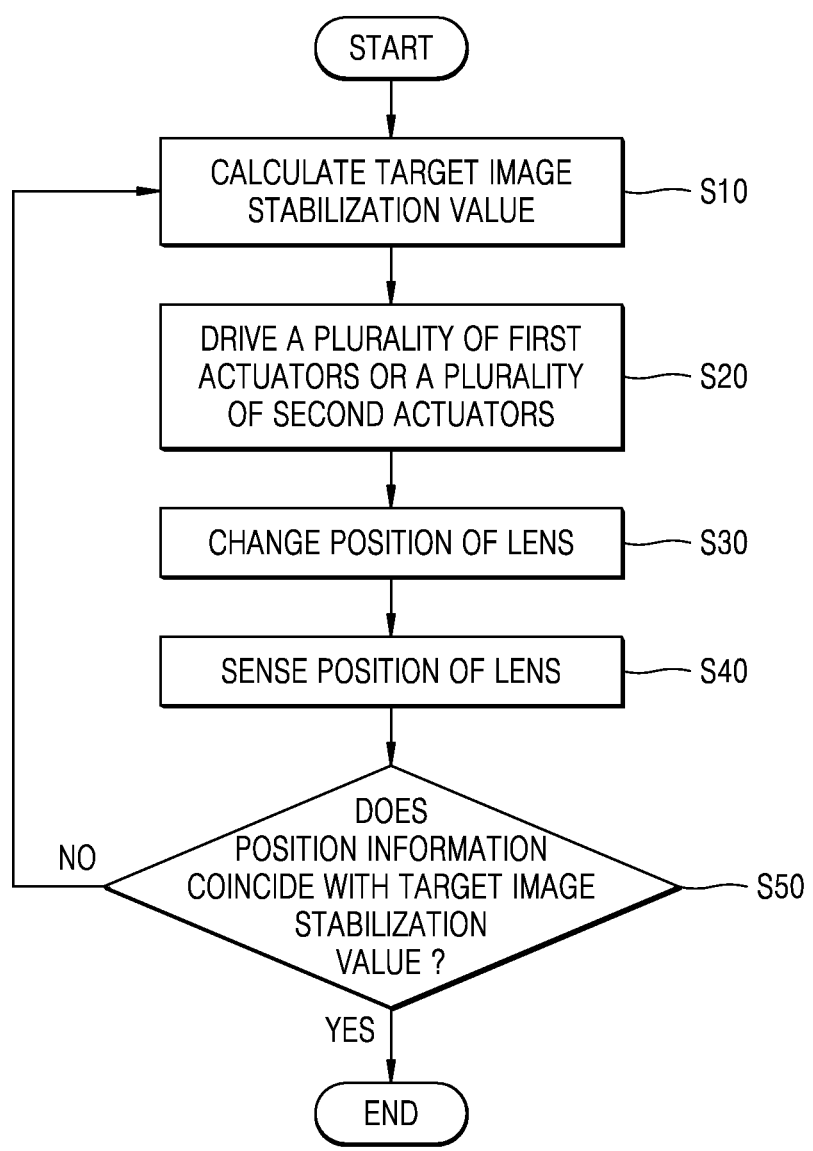
FIG. 8A is a flowchart of an image stabilization function of a camera module according to some example embodiments of the inventive concepts.

FIG. 8A is a flowchart of an image-stabilization function of a camera module 10 according to some example embodiments of the inventive concepts.

Referring to FIG. 2, FIG. 3A and FIG. 8A, if a motion of the camera module 10 or the electronic device 1 including the camera module 10 is detected from the sensor (e.g., a gyro sensor) which senses the motion of the camera module 10 or the electronic device including the camera module 10, the image stabilization module 310 may calculate a target image stabilization value (S10) to move the lens 110 for image-stabilizing the motion. The target image stabilization value may be a value corresponding to the moving distance of the lens 110 in the first direction X or the moving distance of the lens 110 for the image stabilization in the second direction Y.

The image stabilization module 310 may transmit a control signal to the actuator driving module 200 for controlling the actuator driving module 200 to change the position of the lens 110 of the lens assembly 100 based on the calculated target image stabilization value.

The actuator driving module 200 may receive the control signal, and drive the plurality of first actuators 130a_1 and 130a_2 or the plurality of second actuators 130b_1 and 130b_2 (S20). For example, the actuator driving module 200 may apply a voltage to the plurality of first actuators 130a_1 and 130a_2 or the plurality of second actuators 130b_1 and 130b_2. In some example embodiments, the plurality of first actuators 130a_1 and 130a_2 and the plurality of second actuators 130b_1 and 130b_2 may be piezoelectric actuators.

The position of the lens 110 may be changed (S30) by driving the plurality of first actuators 130a_1 and 130a_2 or the plurality of second actuators 130b_1 and 130b_2. For example, the lens 110 may move in the first direction X due to the driving of the plurality of first actuators 130a_1 and 130a_2, while the lens 110 may move in the second direction Y due to the driving of the plurality of second actuators 130b_1 and 130b_2.

The lens position sensor 400 may sense the position of the lens (S40). According to some example embodiments, the lens position sensor 400 may be implemented as a hall sensor. The lens position sensor 400 may transmit the position information of the lens 110 sensed to the image stabilization module 310.

The image stabilization module 310 may check whether the sensing result (e.g. the position information of the lens 110) sensed in the lens position sensor 400 coincides with the calculated target image stabilization value (S50). That is, the image stabilization module 310 may confirm whether the image stabilization is sufficiently performed, according to the movement of the lens 110. If the position information of the lens 110 coincides with the calculated target image stabilization value, the image sensor 500 may convert the light input into an electrical signal through the lens assembly 100, and may transmit the generated image to the processor 20.

On the other hand, if the position information of the lens 110 does not coincide with the calculated target image stabilization value, the image stabilization module 310 may return to step S10 and calculate a new target image stabilization value based on the stabilization error between the position information and the target image stabilization value.

Figure 8B:
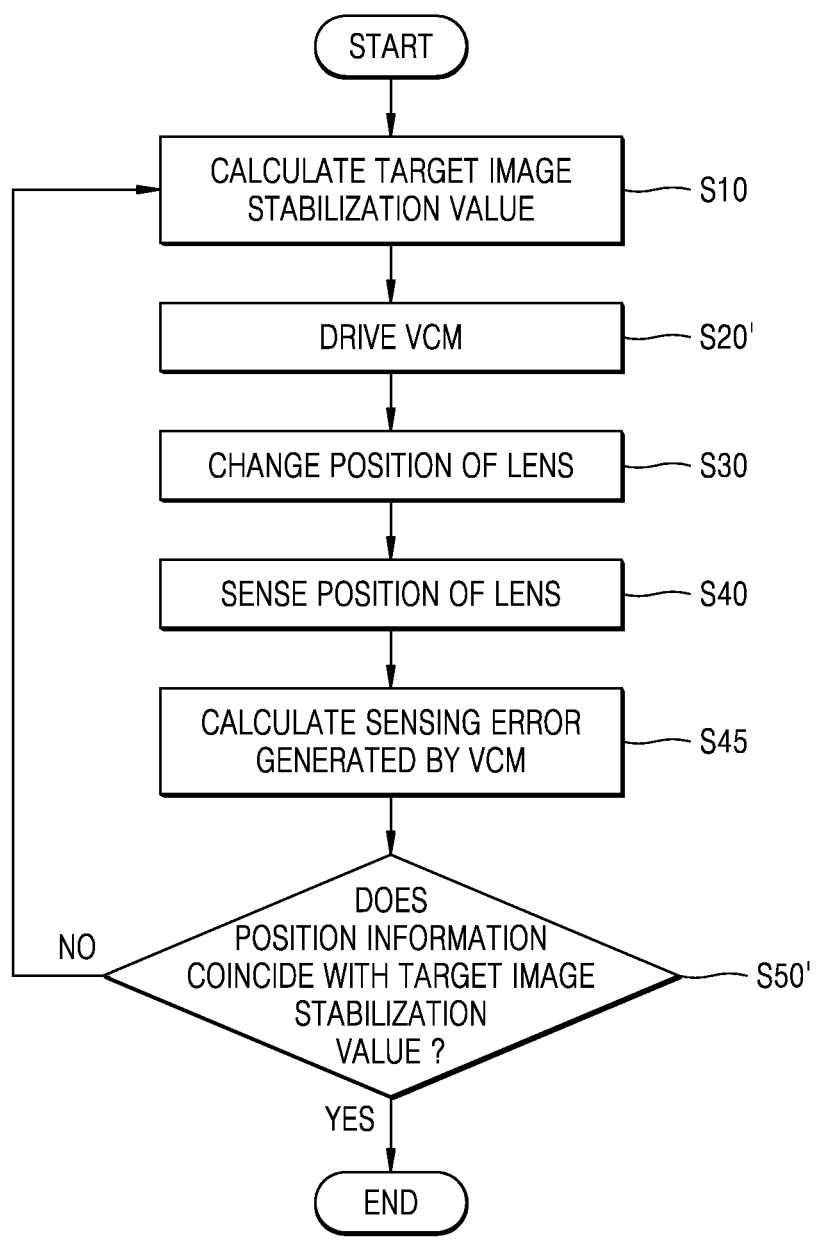
FIG. 8B is a flowchart of an image stabilization function of a conventional camera module.

FIG. 8B is a flowchart of an image stabilization function of a conventional camera module, wherein FIG. 8B is a diagram of a comparison with the image stabilization function of the camera module according to some example embodiments of the inventive concepts.

The conventional camera module may include a voice coil motor (VCM) as an actuator for moving the lens. The voice coil motor may have a structure for positioning the coil inside a permanent magnet, which generates a magnetic field. The voice coil motor operates by the Lorentz force, generated by the current flowing through the coil in the magnetic field.

Referring to FIG. 8B, the image stabilization module in the conventional camera module may calculate a target image stabilization value (S10) for moving the lens to stabilize a motion, when the motion of the conventional camera module or an electronic device including the conventional camera module is detected.

The image stabilization module may transmit a control signal to the actuator driving module to control the actuator driving module for changing the position of the lens, based on the calculated target image stabilization value.

The actuator driving module may receive the control signal, and drive the voice coil motor (S20') in response to the control signal, while the position of the lens may be changed (S30) as the voice coil motor is driven.

The lens position sensor may sense the position of the lens (S40). The lens position sensor in the conventional camera module may be implemented as a hall sensor. Therefore, the magnetic force generated in the coil, at the moment of applying current to the coil of the voice coil motor, may adversely affect the lens position sensor. Accordingly, the position of the lens sensed by the lens position sensor may be different from the actual position of the lens of the conventional camera module.

The image stabilization module may calculate the sensing error of the lens position sensor (S45), which is presumed to be generated by the voice coil motor. The calculated sensing error may be a value, which varies depending on the target image stabilization value.

The image stabilization module in the conventional camera module may acquire the position information of the lens, by reflecting the sensing error calculated in the sensing result, and may confirm whether the position information coincides with the calculated target image stabilization value (S50').

If the position information of the lens coincides with the calculated target image stabilization value, the image sensor may convert the light input into an electrical signal through the lens assembly and may transmit the generated image to the processor of the electronic device including the conventional camera module.

On the other hand, if the position information of the lens does not coincide with the calculated target image stabilization value, the image stabilization module may return to step S10 to calculate a new target image stabilization value based on the stabilization error between the position information and the target image stabilization value.

Referring to FIG. 8A and FIG. 8B, currently in the conventional camera module, the voice coil motor is used as an actuator for moving the position of the lens, which has a problem of a magnetic field affecting the sensing of the position of the lens by the lens position sensor. Therefore, the conventional camera module may further include a separate magnetic field shielding structure for blocking the magnetic forces which affect the lens position sensor, or else there is a problem that the sensing error generated by the voice coil motor needs to be additionally reflected by further performing step S45 as shown in FIG. 8B.

The image stabilization module 310 according to some example embodiments of the inventive concepts may reduce (or eliminate) the undesirable influence of the magnetic field on the lens position sensor by using the piezoelectric actuator instead of the voice coil motor. As the camera module 10 according to some example embodiments of the inventive concepts includes a piezoelectric actuator, the lens position sensor 400 does not require a separate magnetic field shielding structure, and the image stabilization module 310 does not need to consider the influence of a magnetic field in calculating the target image stabilization value. Thus, some example embodiments of the inventive concepts have an advantage over conventional image stabilization techniques that it is not necessary to correct errors in a sensing operation of a sensor in order to accurately calculate the target image stabilization value. Therefore, the image stabilization module 310 may use the sensing result sensed by the lens position sensor 400, reduce the time taken to perform the image stabilization function, and improve the accuracy of the image stabilization function, as compared to the image stabilization module of the conventional camera module. Furthermore, the use of the piezoelectric actuator in the camera module 10 may reduce the amount of electric power consumed as compared to the use of the voice coil motor in the conventional camera module.

Units and/or devices according to one or more example embodiments may be implemented using hardware, a combination of hardware and software, or storage media storing software. Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

Some example embodiments have been disclosed in the drawings and specification as described above. Although particular terms are used herein for describing the example embodiments, the particular terms are used for the purpose of describing the example embodiments of the inventive concepts only, and they are not intended to limit the meaning of and the scope of the inventive concepts as described in the following claims. Therefore, it will be understood that various changes in form and details may be made therein without departing from the spirit and scope of the following claims. Accordingly, the true technical protective scope of the inventive concepts should be determined by the technical ideas of the scope of the claims attached.

What is claimed is:

1. A camera module comprising:
a first frame that is formed to surround a lens and fixes the lens;
a second frame that is formed to surround the first frame and is apart from the first frame;
a third frame that is formed to surround the second frame and is apart from the second frame;
a plurality of first piezoelectric actuators including first piezoelectric material that connects the first frame to the second frame; and
a plurality of second piezoelectric actuators including second piezoelectric material that connects the second frame to the third frame,
wherein the plurality of first piezoelectric actuators are arranged in parallel in a first direction, and the plurality of second piezoelectric actuators are arranged in parallel in a second direction.

2. The camera module of claim 1, wherein
each of the first frame, the second frame, and the third frame is quadrangular, and
each of the first frame, the second frame, and the third frame comprises two sides that are parallel to each other in the first direction and two sides that are parallel to each other in the second direction.

3. The camera module of claim 1, further comprising a guard rail for restricting movement of the second frame in the first direction.

4. The camera module of claim 3, wherein a portion of the second frame is mounted to surround the guard rail.

5. The camera module of claim 1, further comprising at least one first elastic member that is arranged between the first frame and the second frame, and at least one second elastic member that is arranged between the second frame and the third frame.

6. The camera module of claim 5, wherein the at least one first elastic member is arranged in parallel to one of the plurality of first piezoelectric actuators in the second direction, and the at least one second elastic member is arranged in parallel to one of the plurality of second piezoelectric actuators in the first direction.

7. The camera module of claim 5, wherein a material comprised in the at least one first elastic member and the at least one second elastic member is different from a material comprised in the first frame, the second frame, and the third frame.

8. A camera module comprising a lens assembly, the lens assembly comprising:

a first frame that is formed to surround a lens and fixes the lens;

a second frame that is formed to surround the first frame and is apart from the first frame;

a third frame that is formed to surround the second frame and is apart from the second frame;

a plurality of first piezoelectric actuators including first piezoelectric material that connects the first frame to the second frame and adjust a distance between the first frame and the second frame in a first direction; and a plurality of second piezoelectric actuators including second piezoelectric material that connects the second frame to the third frame and adjust a distance between the second frame and the third frame in a second direction perpendicular to the first direction.

9. The camera module of claim 8, wherein a first subset of the plurality of first piezoelectric actuators reduce the distance between the first frame and the second frame, and a second subset of the plurality of the first piezoelectric actuators increase the distance between the first frame and the second frame.

10. The camera module of claim 8, wherein the plurality of first piezoelectric actuators change positions of the lens and the first frame, and the plurality of second piezoelectric actuators change positions of the lens, the first frame, and the second frame.

11. The camera module of claim 8, wherein the lens assembly further comprises a guard rail for restricting movement of the second frame in the first direction.

12. The camera module of claim 11, wherein the second frame comprises two sides that are parallel to each other in the first direction and two sides that are parallel to each other in the second direction, and at least one of the two sides that are parallel to each other in the second direction is mounted to surround the guard rail.

13. The camera module of claim 8, wherein the lens assembly further comprises a first elastic member arranged between the first frame and the second frame, and a second elastic member arranged between the second frame and the third frame.

14. The camera module of claim 8, further comprising:

an actuator driving module configured to apply a voltage to the plurality of first piezoelectric actuators and the plurality of second piezoelectric actuators to drive the plurality of first piezoelectric actuators and the plurality of second piezoelectric actuators; and a controller configured to calculate a target image stabilization value based on motion information of the camera module and perform an image stabilization function based on the target image stabilization value, wherein the target image stabilization value corresponds to information about a position at which the lens is to be located.

15. The camera module of claim 14, wherein the controller is further configured to control the actuator driving module to apply a greater voltage to the plurality of second piezoelectric actuators than to the plurality of first piezoelectric actuators when the lens is moved by a same distance in the first direction and the second direction.

16. The camera module of claim 14, further comprising a lens position sensor for sensing a position of the lens, wherein the controller is further configured to receive position information of the lens from the lens position sensor, compare the position information of the lens with the target image stabilization value, and determine whether the image stabilization function is sufficiently performed based on whether the position information of the lens coincides with the target image stabilization value.

17. An electronic device comprising a camera module, which provides an image stabilization function, the camera module comprising:

a controller configured to perform an image stabilization function; and a lens assembly to which light is incident, wherein the lens assembly includes a first frame that is formed to surround a lens and fixes the lens;

a second frame that is formed to surround the first frame and is apart from the first frame;

a third frame that is formed to surround the second frame and is apart from the second frame;

a plurality of first piezoelectric actuators including first piezoelectric material that connects the first frame to the second frame and adjust a distance between the first frame and the second frame in a first direction; and a plurality of second piezoelectric actuators including second piezoelectric material that connects the second frame to the third frame and adjust a distance between the second frame and the third frame in a second direction.

18. The electronic device of claim 17, wherein the lens assembly further comprises a guard rail for restricting movement of the second frame in the first direction.

19. The electronic device of the claim 17, further comprising:

a first elastic member arranged between the first frame and the second frame; and a second elastic member arranged between the second frame and the third frame, wherein the first elastic member is arranged in parallel to the plurality of first piezoelectric actuators in the second direction, and the second elastic member is arranged in parallel to the plurality of second piezoelectric actuators in the first direction.

20. The electronic device of claim 17, further comprising a plurality of camera modules, wherein at least one of the plurality of camera modules provides the image stabilization function.

* * * * *